Patented June 10, 1924.

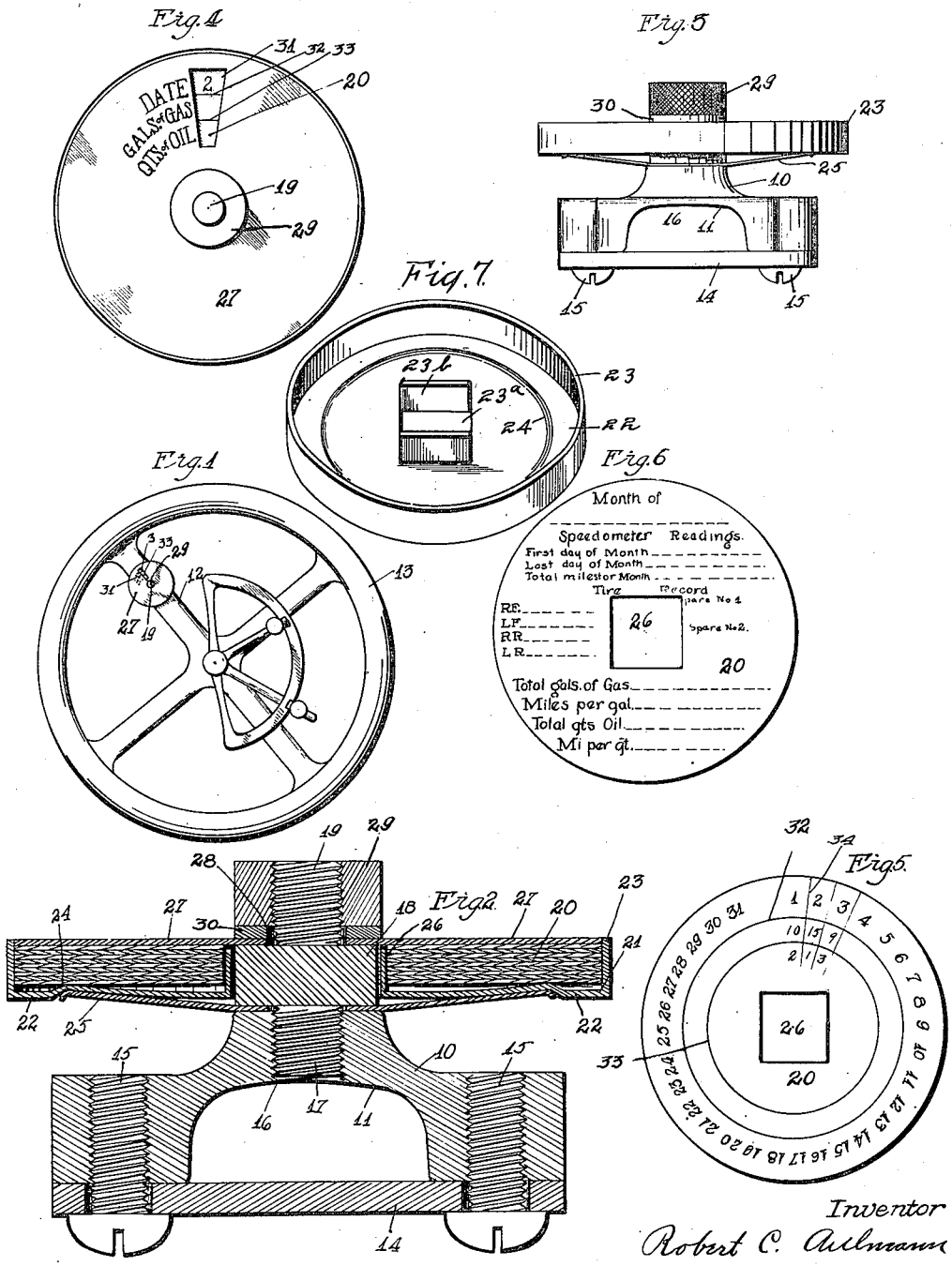

1,496,865

UNITED STATES PATENT OFFICE.

ROBERT C. AULMANN, OF DES MOINES, IOWA.

AUTOMOBILE RECORD DEVICE.

Application filed March 28, 1921. Serial No. 456,151.

*To all whom it may concern:*

Be it known that I, ROBERT C. AULMANN, a citizen of the United States, and resident of Des Moines, in the county of Polk and State of Iowa, have invented a certain new and useful Automobile Record Device, of which the following is a specification.

The object of my invention is to provide a simple, durable and inexpensive device for keeping record of certain expenditures in connection with the operation of automobiles and similar devices.

More specifically, it is the object of my invention to provide a record device adapted to be used on a steering wheel of an automobile or any other convenient place and so constructed that a record may be easily and quickly entered of the amount of gasoline and oil used in running the automobile.

A still further object is to provide a recording device of the class described provided with a series of detachable record sheets mounted in a container in such a manner that they will be free from dust or grease and of a compact form, each of the sheets having one side so printed that a daily record may be kept of the number of gallons of gasoline and quarts of oil purchased during the day, and the opposite side of each sheet having a printed table for the purpose of entering the monthly average or sums of the daily records.

These and other objects will be apparent to those skilled in the art.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a plan elevation of a steering wheel for an automobile showing my improved automobile record device attached thereto.

Figure 2 is a central sectional view of my improved device detached from the wheel.

Figure 3 is a side elevation of the same.
Figure 4 is a plan view of the same.
Figure 5 is a plan view of one of the record sheets removed from the container.
Figure 6 is a bottom view of the same showing the tabulation for the monthly averages.

Figure 7 is a perspective view of the container of my improved device.

My automobile record device comprises a bracket 10 having a grooved portion 11 designed to fit the upper surface of a spoke 12 of the ordinary steering wheel 13, such as is used on automobiles.

This bracket 10 is secured in position, as shown in Figure 1, by means of a plate 14, being placed on the under side of the spoke 12 and secured in position to said bracket by means of machine bolts 15. The upper portion of the bracket 10 is provided with a screw threaded opening 16, which is designed to receive a screw threaded lug 17 of a cylindrical member 18. The member 18 is also provided with an upwardly extending screw threaded member 19. This cylindrical member 18 forms what I shall term a pivot member, upon which record sheets 20 are pivotally mounted. These sheets are mounted in a cylindrical container 21, having a bottom portion 22 and an angular flange portion 23. The bottom portion 22 is provided with an upwardly extending rib 24 upon which the record sheets rest, and a square opening 23ª. This opening is provided at two of its edges with upturned members 23ᵇ. The opening of the container 21 is pivotally and slidingly mounted on the member 18, and also rotatively mounted on the spring disc 25, which is secured in position between the shoulders of the member 18 and the upper surface of the bracket 10.

The ends of the spring 25 are designed to rest in the inner side of the flange portion 24, as clearly shown in Figure 2. Each of the sheets 20 is provided with a square opening 26 of such a size as to loosely pass over the members 23ᵇ, said sheets being of such diameter that they will loosely fit the inner face of the flange 23. The members 23ᵇ are so arranged that when the said container is rotated, the sheets will be rotated therewith.

I have provided a covering for the container which comprises a disc 27 of a diameter slightly less than the inner diameter of the flange 23, and provided with an opening 28 designed to be set over the pin 19. The disc 27 rests on the top of the member 18, the said disc 27 is rigidly and detachably held in position by means of a nut 29 and a washer 30. This washer may be dispensed with if so desired.

By this construction, it will be seen that the sheets within the container 21 will be held adjacent to the under surface of the disc 27 by means of the action of the spring disc 25. It will also be seen that if the container 21 is rotated, that the said sheets 20 will also be rotated beneath the disc 27 due to the engagement between the member 23$^b$ and the edges of the opening 26.

The disc 27 is also provided with an opening 31, the side edges of which are arranged in radial lines with the center of the disc. The edges of the slot 31 are substantially equal to $\frac{1}{32}$nd of the circumference of the circle through the said slot having its center at the center of the disc, and providing means through which a lead pencil or similar device may be operated to enter records on the upper sheets 20 beneath the disc 27. Each of the said sheets 20 has one of its sides provided with an annular row of numbers near its edge arranged in consecutive order from 1 to 31 to represent the days of a month, as clearly shown in Figure 5. This row of numbers is so arranged and spaced that they will make an almost complete circle around the edge of the said disc, and also so mounted that they may be moved beneath the opening 31 at a point adjacent to its outer end, and the width of the slot 31 being such that a single number may be observed through the said opening at one time. It will also be observed from Figure 5 that I have arranged two circular lines 32 and 33 concentrically with the center of the said disc which are for the purpose of providing spaces in which data may be written to represent the gallons of gasoline, or quarts of oil used, or any other article which the operator may desire to keep record of.

The space between each of the numbers represents the days of the month and is provided with a radial line 34 for the purpose of separating the date corresponding to two adjacent numbers, as clearly shown in Figure 5.

By this arrangement, it will be seen that if the operator wishes to keep a record of the number of gallons of gasoline and quarts of oil consumed, he has the inscription shown in Figure 4 placed on the disc 27 in the manner as indicated in said figure with the word date opposite the line in which the numerals are placed. Thus, if on the second day of the month the operator wishes to make a record of the number of gallons of gasoline purchased, he will rotate the container 21 until the number 2 appears in the slot 31, at which time he will write the number of gallons purchased in the first space below the numeral 2 and the number of quarts of oil purchased in the second space below, thereby providing means whereby he may ascertain at the end of the month the total number of gallons of gasoline and the quarts of oil purchased during the month. By removing the nut 29 of the washer 30 from the pin 19 and then removing the disc 27, he may then easily remove the upper sheet 20 from the container and add up the total of each of the items and enter them on the back of the sheet in the tabulated tables provided for the purpose, as clearly shown in Figure 6.

The form of these tables may be any convenient form which the operator may see fit to use. After the tables on the back of the sheet have been filled out, the entire bunch of sheets from the container may be removed and the used sheets placed in the bottom, if it is so desired. After the used sheets have been removed from the top of the pile of sheets and placed at the bottom, the disc 27 is replaced and the top sheet of the pile will be in operative position for receiving any record which the operator wishes to make. The spring 25 will move the top sheet into contact with the disc 27.

By this arrangement, it will be seen that a number of sheets may be placed within the container, preferably enough to last for a year, and the used sheets may be removed when they have become filled, the spring disc 25 will always move the container in position so that the top sheet will always engage the under face of the disc 27 and thereby provide means whereby dirt or dust cannot enter beneath the said disc as the sheets are held rigidly against the inner surface.

Thus it will be seen that I have provided a record device of simple, durable and inexpensive construction which is very compact and is adapted to be placed on the steering wheel of an automobile where it is always easy to reach when it is desired to place a record thereon.

It will be understood that the arrangement of the numerals indicating the days of the month and also the arrangement of the record columns may be varied without departing from the spirit of my invention. Also the sheets may be made with or without the monthly tabulation or this tabulation may be any other convenient arrangement.

I claim:

1. In a device of the class described, a bracket having a pivot member, a disc secured thereto having a record entering opening, a series of record sheets rotatively mounted on said pivot member and means for rotating said sheets and yieldingly holding one face to said disc for the purpose stated.

2. In a device of the class described, a bracket having a pivot member, a container rotatively and slidably mounted centrally thereon designed to carry a series of record sheets, a disk fastened to said pivot member provided with an opening through which an item of record may be entered, and means for yieldingly moving the bottom of said container toward said disk, for holding a record sheet adjacent thereto.

3. In a device of the class described, a bracket having a pivot member, a container rotatively and slidingly mounted centrally thereon, designed to carry a series of record sheets, a series of record sheets within said container, a disc fastened to said pivot member provided with an opening through which an item of record may be entered and adjacent to one of said record sheets, and means for yieldingly moving the bottom of said container toward said disc for holding one of said sheets adjacent thereto.

4. In a device of the class described, a bracket having a pivot member, a disc detachably secured thereto having a radial record entering opening, a circular record sheet on said pivot member adjacent to said disc, said record sheet having printed on the adjacent side a series of consecutive numbers near its perforation to represent the days of a month, and a series of spaces concentrically circular to provide a space for record columns, the said spaces and numbers being designed to coact with said record opening, and means for yieldingly supporting one of said sheets adjacent to said disc and rotating it relative thereto.

Des Moines, Iowa, January 25, 1921.

ROBERT C. AULMANN.